United States Patent [19]

Bohman et al.

[11] 4,042,132
[45] Aug. 16, 1977

[54] SPOUT CONTROL APPARATUS FOR AGRICULTURAL MACHINES

[75] Inventors: Carl E. Bohman, Sudbury; Hubert R. Durling, Jr., Lancaster; Leon Susman, Sudbury; Norman F. Rolfe, Carlisle, all of Mass.

[73] Assignee: Sperry Rand Corporation, New York, N.Y.

[21] Appl. No.: 689,422

[22] Filed: June 1, 1976

[51] Int. Cl.² .............................................. B65G 67/22
[52] U.S. Cl. ................................................ 214/42 A
[58] Field of Search ................ 214/42 R, 42 A, 1 CM

[56] References Cited

U.S. PATENT DOCUMENTS

| | | | |
|---|---|---|---|
| 3,144,146 | 8/1964 | Strickland, Jr. | 214/1 CM X |
| 3,786,945 | 1/1974 | Symonds | 214/42 A |

Primary Examiner—Albert J. Makay
Attorney, Agent, or Firm—Howard P. Terry

[57] ABSTRACT

The crop discharge spout of an agricultural machine is continuously adjusted so that the crop material discharged therefrom is always directed into a wagon connected to the rear of the agricultural machine. A sensor disposed on the agricultural machine cooperates with a mechanical follower which is coupled therefrom to the wagon to provide a signal indicative of the angle between the agricultural machine and the wagon. The signal is compared with a signal from a second sensor indicative of the angle of the direction of the crop discharge from the spout with respect to the agricultural machine and an error signal is developed from the difference therebetween. The error signal is coupled to a motor which rotates the discharge spout accordingly until the error signal is reduced to zero.

8 Claims, 7 Drawing Figures

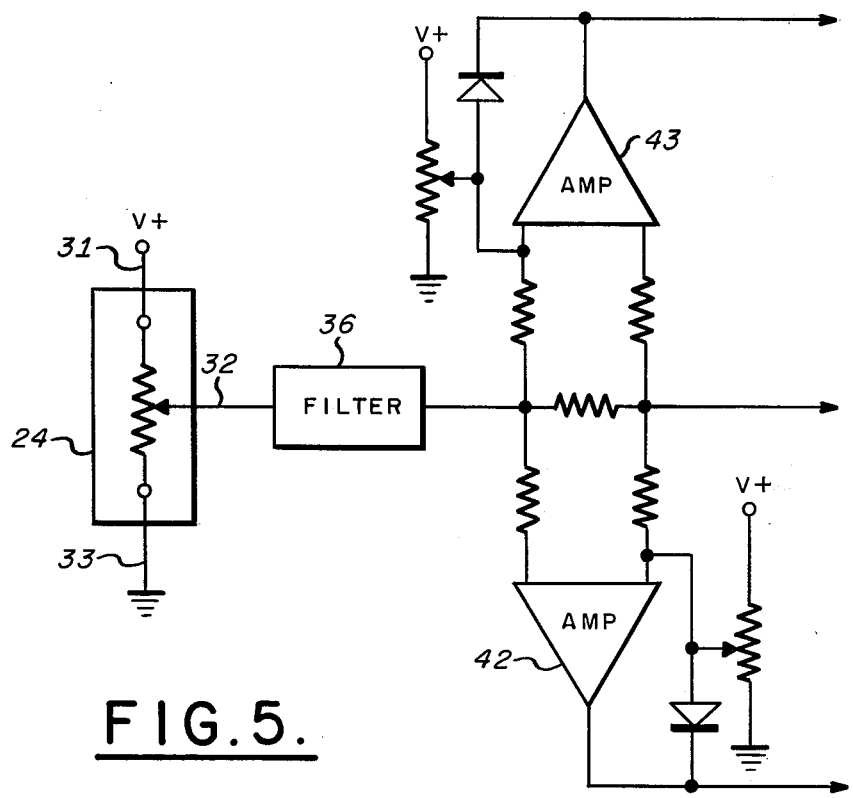
FIG. 5.
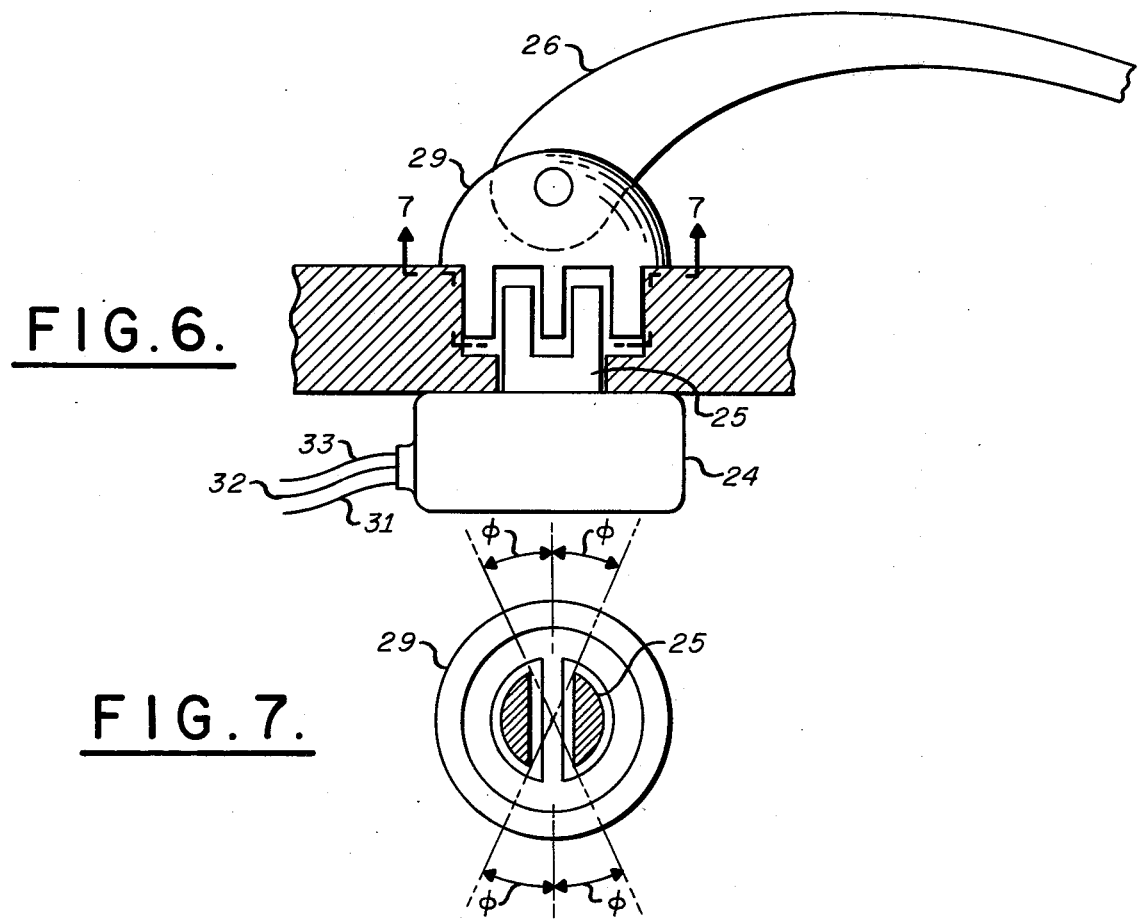
FIG. 6.
FIG. 7.

SPOUT CONTROL APPARATUS FOR AGRICULTURAL MACHINES

BACKGROUND OF THE INVENTION

1. Field of the Invention

The apparatus relates to agricultural harvesting machines and more particularly to apparatus for automatically regulating a crop discharge spout thereon with respect to a trailing storage wagon.

2. Description of the Prior Art

When operating an agricultural machine having a discharge spout through which the harvested crop is directed into a wagon trailing therebehind, it becomes necessary at various times, such as when maneuvering around corners, to redirect the discharge spout so that the harvested crop is continually directed into the wagon. Traditionally, this task has been performed by one of two basic methods. The first requires the operator to manually align the discharge spout by turning a crank in the appropriate direction. The crank is coupled to a worm gear which positions the discharge spout in response to the rotation of the crank.

A second traditional method comprises a switch and a bidirectional electromechanical unit which is coupled to the discharge spout. The operator, when maneuvering around a corner, actuates the switch until the discharge spout is aligned properly.

The foregoing traditional methods are obviously limited by the fact that both require the attention and concentration of the operator at a particularly undesirable time. Specifically, both require the operator to look back an follow the operation of the discharge spout when substantial concentration is required to maneuver the agricultural machine around a corner thereby creating a safety hazard in addition to inefficient operation.

More recently, automatic spout control systems have appeared. One such system employs a completely mechanical means for positioning the discharge spout in response to the movement of the wagon. However, such a method is not only expensive but also limits the mechanical design of the harvesting machine.

Another such system is described in U.S. Pat. No.3,786,945 entitled "Spout Control System", in the name of Dean Symonds. In this system, a large coil of wire is wrapped around the trailing wagon and is energized with an alternating current to produce a magnetic field. A signal coil is mounted on the discharge spout and situated such that its axis is perpendicular to the axis of the coil of wire wrapped around the wagon. In this orientation, minimum coupling is effected between the two coils. When a deviation from this alignment occurs, more substantial coupling of energy between the coils is effected and is detected by a phase detecting circuit. The output from the phase detecting circuit is coupled through an amplifier to an electro-hydraulic unit which positions the spout accordingly. The foregoing is, however, limited by the cost of the apparatus and the fact that an active electronic unit is required on the wagon in addition to that incorporated in the harvesting machine.

SUMMARY OF THE INVENTION

The present invention comprises a sensor, preferably a potentiometer, having a wiper which is coupled through a mechanical follower to the trailing wagon such that variations in the angle between the longitudinal axes of the agricultural machine and the wagon are proportionally reflected therein. The second sensor, preferably a potentiometer, is coupled through appropriate gearing to the discharge spout and therefore provides an indication of the angle of the direction of the crop discharge with respect to the longitudinal axes of the agricultural machine. The outputs from the sensors are coupled to a comparator wherein an error signal is generated from the difference therebetween. The error signal is coupled to the bidirectional d.c. motor inducing a response therefrom adjusting the discharge spout until the error signal is substantially reduced to zero.

Also included in the present invention are means for compensating for spurious vibrations or jitter and relatively small variations in the angle between the harvesting machine and the wagon which inherently occur during normal operation. This compensation means may comprise an electronic circuit coupled to the output of the first sensor means for filtering said small variations therefrom or may comprise a mechanical idler coupled between the wiper arm of the first sensor and the mechanical follower which prevents operation of the wiper of the potentiometer until a substantial deviation in the angle between the harvesting machine and the wagon occurs. Additionally, the apparatus may be provided with a control switch which permits the operator to manually control the operation of the discharge spout or condition the apparatus for automatic operation of the discharge spout.

BRIEF DESCRIPTION OF THE DRAWINGS

FIG. 5 is a schematic diagram of an alternate embodiment of the invention as shown in FIG. 4 further including a filter circuit.

FIG. 6 is an illustration of a mechanical idler disposed between a mechanical follower and the wiper arm of a potentiometer.

FIG. 7 is a partial sectional view of FIG. 6 illustrating a present angular deviation.

DESCRIPTION OF THE PREFERRED EMBODIMENT

Figure 1:
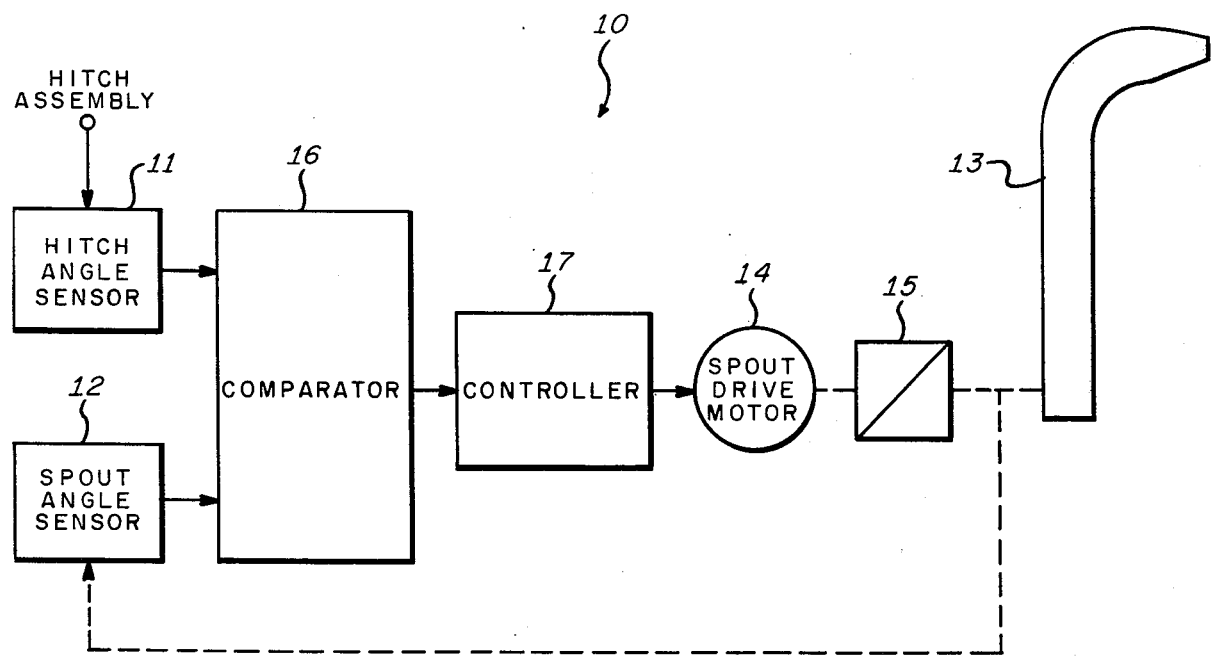
FIG. 1 is a block diagram of the apparatus comprising the present invention.

Referring now to FIG. 1, a block diagram of the apparatus 10 comprising the present invention is depicted. A hitch angle sensor 11 is coupled to the hitch assembly between the agricultural machine and the wagon and provides an output which is representative of the angle therebetween. A spout angle sensor 12 which is coupled to the discharge spout 13 on the agricultural machine and to the spout drive motor 14 through suitable gearing 15, provides an output signal representative of the angle between the direction of the crop discharged from spout 13 and the longitudinal axis of the agricultural machine. The outputs from both sensors are coupled to a comparator 16 which generates an error signal from the difference therebetween. The error signal is coupled through the motor control circuit 17 to the spout drive motor 14 when the motor control circuit 17 is conditioned for automatic operation of the apparatus. The spout drive motor, in response to the error signal, adjusts the discharge spout 13 through the gearing 15 until the error signal is effectively reduced to zero.

Figure 2:
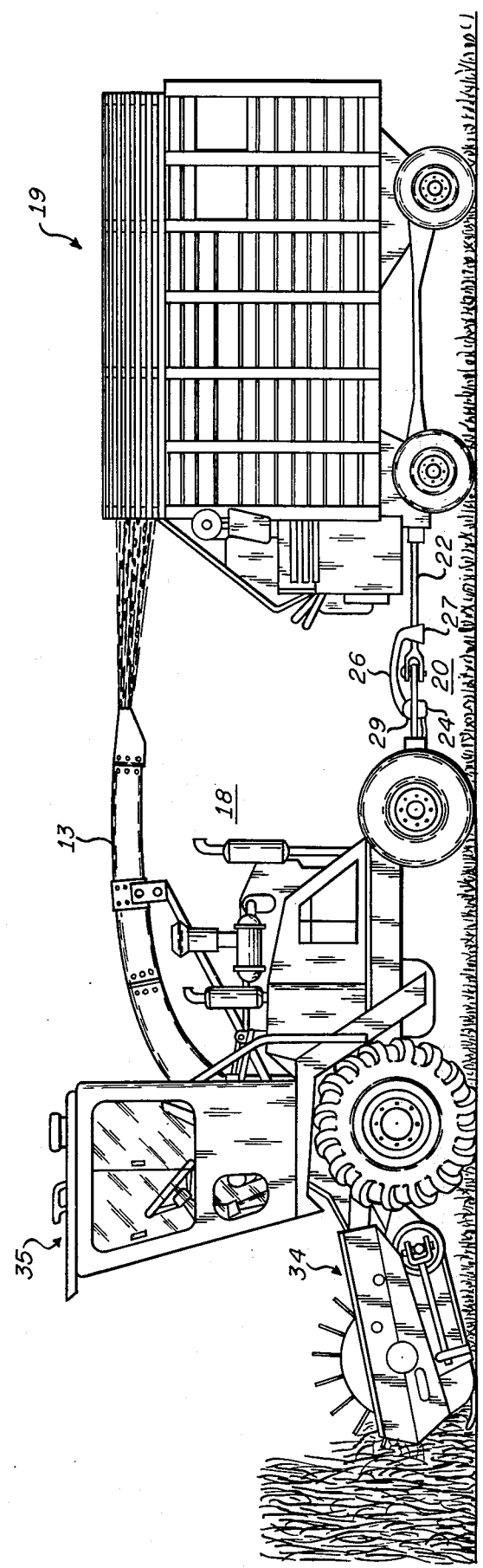
FIG. 2 is an illustration depicting a typical agricultural machine such as a forage harvester and a storage wagon trailing therebehind and utilizing the apparatus of the present invention.

Referring now to FIG. 2, a typical arrangement, comprising an agricultural machine 18, such as a forage harvester, and a trailing storage wagon 19 is depicted. The forage harvester 18 and wagon 19 are connected together by means of a hitch assembly 20 which will be detailed hereinafter in connection with the discussion with respect to FIG. 3.

The crop material of forage is harvested by the header assembly 34 and fed to the discharge spout 13 from which it is discharged at sufficient velocity to carry it into the storage wagon 19. From the illustration in FIG. 2, it can be appreciated that when the operator is maneuvering the harvester around corners, etc., the discharge spout 13 must be adjusted accordingly in order to insure that the harvested forage is directed properly to within the storage wagon 19. As noted earlier, in the absence of an automatic spout control system, the operator, who is situated in the cab 35, must continually look back in order to properly adjust the discharge spout 13 during such maneuvers. Moreover, the operator, in addition to steering the harvester 18, must simultaneously adjust the discharge spout 13 either manually or by means of an electrohydraulic mechanism as hereinbefore described.

Figure 3:
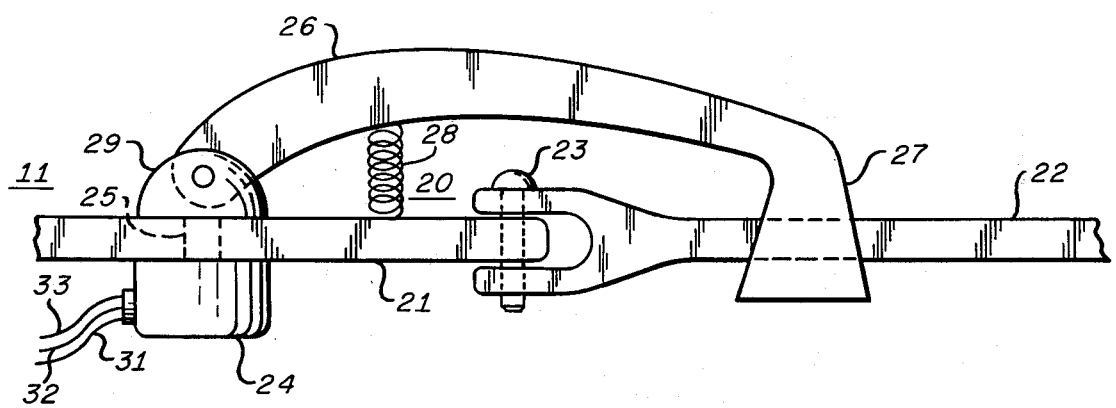
FIG. 3 is an enlarged view of the hitch assembly connecting the harvester and the wagon in FIG. 2 and depicting the apparatus of the present invention utilized to sense the angle therebetween.

Referring now to FIG. 3, an enlarged view of the hitch assembly 20 is depicted including the incorporation of the sensor apparatus 11 utilized to sense the angle between the harvesting machine 18 and the storage wagon 19. As depicted therein, the hitch assembly between the harvester or agricultural machine and the trailing wagon is comprised of a hitch bar 21 typically extending from the rear of the agricultural machine and defining the longitudinal axis thereof; a wagon tongue 22 typically extending from the front of the storage wagon and defining the longitudinal axis thereof; and a hitch pin 23 utilized to secure the wagon tongue 22 and the hitch bar 21 together.

The hitch angle sensor 11, preferably comprised of a potentiometer 24 having leads 31, 32, 33 and a rotatable wiper arm 25 which is coupled to the wagon tongue 22 by means of a mechanical follower 26. The mechanical follower 26 is coupled to the wagon tongue 22 by means of a tapered end 27 as shown in FIG. 3 which permits the follower 26 to follow the wagon tongue 22 as the agricultural machine is maneuvered around corners thereby creating an angle between the hitch bar 21 and the wagon tongue 22. Additionally, a spring 28 is incorporated to insure a continued coupling between the mechanial follower 26 and the wagon tongue 22.

In operation, it will be appreciated, that when the harvester or agricultural machine is maneuvered around a corner, etc. an angle is created between the hitch bar 21 and the wagon tongue 22 and thus between the longitudinal axes of the agricultural machine 18 and the wagon 19. In response to the angle, a proportionate rotational torque is applied to the wiper arm 25 by the mechanical follower 26. Accordingly, the resistance between leads 32 and 31 and between 32 and 33 (where lead 32 is coupled to the wiper arm of potentiometer 24) extending from potentiometer 24 will vary proportionately with respect to the deviation in the angle between the hitch part 21 and the wagon tongue 22.

Figure 4:
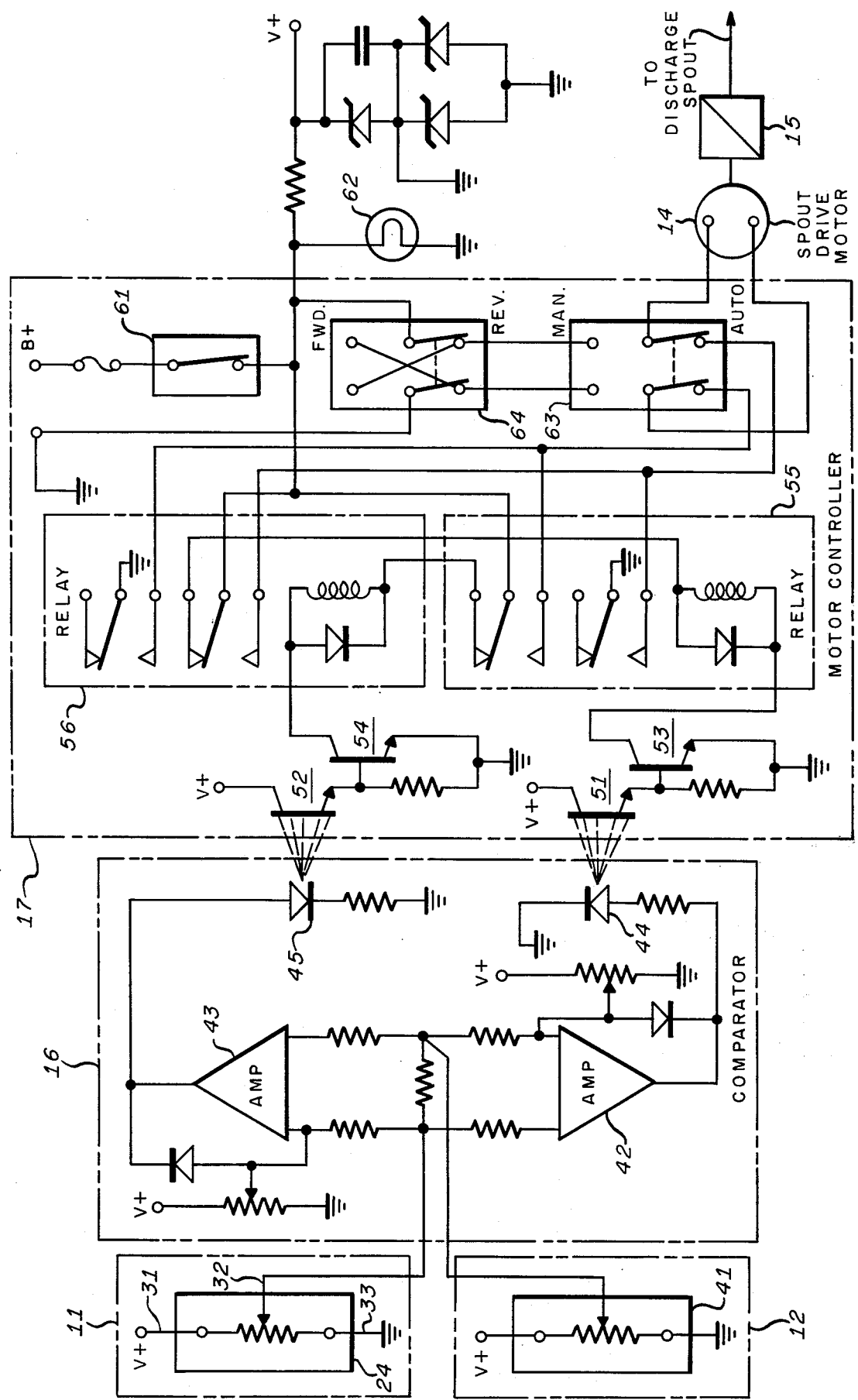
FIG. 4 is a schematic diagram of the apparatus comprising the present invention.

Referring now to FIG. 4, a schematic diagram of the apparatus comprising the present invention is depicted. The potentiometers 24 and 41 comprising the hitch angle sensor 11 and the spout angle 12 respectively are coupled to the power source for the apparatus as shown. Typically, the power source for the apparatus may be derived from a separate battery or from the agricultural machine itself if the proper filtering is incorporated (not shown in FIG. 4). The wiper arm of each of the potentiometers 24 and 41 are electrically connected to the inputs of comparator circuit 16.

The comparator circuit 16 is preferably comprised of two operational amplifiers 42 and 43 and the associated resistor components depicted in FIG. 4. The outputs of the operational amplifiers 42 and 43 are coupled to light emitting diodes (LEDs) 44 and 45, respectively. It can be appreciated from FIG. 4 that potentiometers 24 and 41 form a bridge circuit with operational amplifiers 42 and 43 such that any imbalance in either of the potentiometers 24 or 41 resulting from a deviation from the proper alignment between the discharge spout and the trailing wagon will be detected by the comparator and result in an illumination from one of the LEDs 44, 45.

It will be further appreciated that LEDs 44 and 45 are used at the outputs of operational amplifiers 42 and 43 to provide circuit isolation between the comparator 16 and the motor control circuitry 17. Moreover, dual operational amplifier circuits are utilized in order to provide gain and to properly bias the LEDs. Accordingly, illumination will emanate from LED 44 in response to a misalignment of the discharge spout 13 and the wagon 19 which requires, for example, a clockwise adjustment of the discharge spout whereas an illumination will emanate from LED 45 when a misalignment occurs between the discharge spout 13 and the trailing wagon 19 which requires a counterclockwise adjustment of the discharge spout 13.

The comparator outputs, representing a misalignment of either one phase or the opposite, or optically coupled to a pair of associated photo-transistors 51, 52 in the motor control circuit. More particularly, LED 44 is physically disposed so that the illumination therefrom is optically coupled to photo-transitor 51 whereas LED 45 is physically disposed so that the illumination therefrom is similarly optically coupled to photo-transistor 52. Suitable optical shielding (not shown) is utilized with respect to both LED-photo-transistor pairs. The outputs from photo-transistors 51 and 52 are respectively coupled to relay driver transistors 53 and 54. The relay driver transistors 53 and 54, in response to an output from the associated photo-transistor, wwill begin conducting thereby causing the energization of the associated relay. More particularly, relay 55 will energize in response to an illumination of LED 44 whereas relay 56 will energize in response to an illumination from LED 45.

The motor control circuit 17 also includes a start switch 61 for coupling or decoupling power to the apparatus of the present invention. An indicator lamp 62 is provided to indicate the status of the apparatus (i.e., on or off). A manual/automatic switch 63 is also incorporated to permit the operator to either manually control the alignment of the discharge spout by setting switch 63 to the manual position or to permit automatic operation thereof by selecting the automatic position of switch 63. A forward/reverse switch 64 is also incorporated in the motor controller 17 to permit the operator, during manual operation of the discharge spout, to adjust the discharge spout in either direction by reversing the polarity of the potential source coupled to the spout driver motor 14.

Referring once again to relays 55 and 56, it will be appreciated that the relay contacts associated with each are arranged such that relay 55 is prevented from energizing while relay 56 is energized and, similarly, relay 56 is prevented from energizing when relay 55 is energized. Additionally, the remaining contacts of each relay 55 and 56 are arranged so that the polarity of the potential coupled to start driver motor 14 when relay 55 is energized is opposite that applied to relay driver motor 14 when relay 56 is energized. Accordingly, when the apparatus is operating in the automatic mode, the energization of relay 55 will induce a coupling of a potential to relay driver motor 14 which will result in, for example, clockwise rotation of the discharge spout through gearing 15 whereas the counterclockwise rotation will result in response to a similar energization of relay 56.

In order to prevent the apparatus from reacting to spurious vibrations or minimum deviations in the angle between the agricultural machine 18 and the trailing wagon 19, a compensation means may be incorporated. The compensation provided thereby may be performed electrically and has the net result of creating a "dead zone" in which there is no adjustment of the discharge spout.

An electrical compensation circuit as shown in FIG. 5 may comprise a filter circuit 36 coupled between the wiper arm output of potentiometer 24 and the associated input of comparator 16 which will prevent the comparator 16 from sensing an imbalance in the potentiometer 24 resulting from the aforementioned small deviations or the jitter occuring at the hitch assembly which typically occurs during normal operation of the agricultural machine.

In the alernative, however, a mechanical idler 29 as shown in FIGS. 6 and 7 may be incorporated between the mechanical follower 26 an the wiper arm 25 of potentiometer 24. The mechanical idler 29 is arranged to permit rotation of the potentiometer wiper arm 25 only when the rotation of the mechanical follower 26 exceeds a present angular deviation. As shown in FIG. 7, a clockwise or counterclockwise angular displacement $\phi$ of the mechanical idler 29 will not produce a resultant displacement of the wiper arm 25. However, any angular displacement greater than $\phi$ will result in rotation of the wiper arm 25. Thus an angular dead zone of $\pm \phi$ is provided by the mechanical idler 29. This arrangement will not only provide a desired dead zone compensation but will also increase the useful life of potentiometer 24 by decoupling therefrom the constant jitter, etc. associated with normal operation of the agricultural machine.

It can be appreciated, therefore, that the apparatus of the present invention encompasses a spout control system for an agricultural machine which may be manually or automatically operated. The present invention represents a significant cost improvement over prior art discharge spout control systems, while providing reliable automatic operation of the discharge spout. Additionally, the apparatus of the present invention does not require a separate power source disposed in the trailing wagon, nor does it require any other apparatus disposed therein, nor does it require any special machining or fabrication thereof. It should be further noted that the embodiment of the comparator circuit 16 depicted in FIG. 3 is only one of many such embodiments which may be successfully incorporated in the present invention.

While the invention has been described in its preferred embodiments, it is to be understood that the words which have been used are words of description rather than limitation, and that changes may be made within the purview of the appended claims without departing from the true scope and spirit of the invention in its broader aspects.

We claim:

1. Apparatus for automatically controlling the direction of a crop discharge spout on an agricultual machine with respect to a wagon attached thereto by means of a hitch assembly, said apparatus comprising:
    first sensor means for providing a first sensor signal representative of the angle between the longitudinal axes of said agricultural machine and said wagon,
    second sensor means for providing a second sensor signal representative of the angle between the direcion of the crop discharge from said crop discharge spout and the longitudinal axis of said agricultural machine,
    comparator means for comprising said first and second sensor signals and providing an error signal derived from the difference therebetween, and
    utilization means coupled to said crop discharge spout and responsive to said error signal for adjusting the direction of the crop discharge from said crop discharge spout so that the discharged crop is continually directed into the wagon.

2. The apparatus as described in claim 1 wherein said first sensor means comprises a potentiometer disposed on the agricultural machine having a rotatable wiper arm coupled to a mechanical following means, and wherein said mechanical following means is coupled from said wiper arm to said wagon such that variations in the angle between the longitudinal axes of said agricultural machine and said wagon are coupled to said wiper arm resulting in an angular rotation thereof proportionate to the angle between said axes.

3. The apparatus as described in claim 2 wherein said utilization means is comprised of a bidirectional d.c. motor coupled through appropriate gearing to said crop discharge spout.

4. The apparatus as described in claim 3 wherein said second sensor means is comprised of a potentiometer having a wiper arm coupled through gearing to said bidirectional d.c. motor.

5. The apparatus as described in claim 4 further including compensation means for cancelling the effects of spurious vibrations and minimal variations in the angle between the longitudinal axes of said agricultural machine and said wagon.

6. The apparatus as described in claim 5 wherein said compensation means is comprised of an electronic circuit means coupled to the output of said first sensor means for cancelling relatively small variations in the output therefrom.

7. The apparatus as described in claim 5 wherein said compensation means is comprised of a mechanical idler coupled between the wiper arm of said first sensor means and said mechanical following means as arranged such that only variation in the angle between said longitudinal axes exceeding a predetermined value are coupled to the wiper arm of said first sensor means.

8. The apparatus as described in claim 5 further including a motor controller means coupled between said comparator means and said utilization means for permitting the operator to manually adjust said discharge spout or allow the apparatus to automatically adjust said discharge spout.

* * * * *